(12) United States Patent
Lundman (10) Patent No.: US 8,161,999 B2
(45) Date of Patent: Apr. 24, 2012

(54) SWING VALVE (75) Inventor: Philip L. Lundman, Fredonia, WI (US)

(73) Assignee: Petersen Products Co., LLC, Fredonia, WI (US)

( * ) Notice: Subject to any disclaimer, the term of this patent is extended or adjusted under 35 U.S.C. 154(b) by 438 days.

(21) Appl. No.: 12/495,946

(22) Filed: Jul. 1, 2009

(65) Prior Publication Data

US 2010/0001218 A1    Jan. 7, 2010

Related U.S. Application Data (60) Provisional application No. 61/077,287, filed on Jul. 1, 2008.

(51) Int. Cl.
*F16K 1/18* (2006.01)

(52) U.S. Cl. ........ 137/385; 251/175; 251/287; 251/298; 277/605

(58) Field of Classification Search ................ 137/385; 251/305–308, 298, 299, 303, 286–288, 175, 251/94; 277/583, 605, 646
See application file for complete search history.

(56) References Cited

U.S. PATENT DOCUMENTS

| | | | | |
|---|---|---|---|---|
| 1,643,753 | A * | 9/1927 | Slattery | 251/94 |
| 2,170,744 | A * | 8/1939 | Adler | 267/175 |
| 2,705,016 | A * | 3/1955 | Saar | 137/1 |
| 2,970,803 | A * | 2/1961 | Harza | 251/175 |
| 3,042,360 | A * | 7/1962 | Sneddon | 251/175 |
| 3,532,321 | A * | 10/1970 | Bowman et al. | 251/175 |
| 3,837,616 | A * | 9/1974 | Castriota-Scanderbeg | 251/30.01 |
| 4,130,129 | A * | 12/1978 | Pollock | 137/385 |
| 6,076,836 | A * | 6/2000 | Bretschneider et al. | 277/642 |
| 6,568,422 | B2 * | 5/2003 | Niessen | 137/385 |
| 6,827,354 | B2 * | 12/2004 | Cornelius et al. | 277/628 |

* cited by examiner

*Primary Examiner* — John Bastianelli (74) *Attorney, Agent, or Firm* — Michael Best & Friedrich LLP (57) ABSTRACT

A swing valve includes a body having an inner surface defining an opening, a plate positioned substantially within the opening of the body, and a pivot rod coupled to the body and the plate. The pivot rod defines a pivot axis. The plate is pivotable about the pivot axis relative to the body between an open position and a closed position. The swing valve also includes a locking mechanism coupled to the plate. The locking mechanism includes a member that is movable relative to the plate between a first position, in which the locking mechanism engages the body to lock the plate in the closed position, and a second position, in which the locking mechanism disengages the body to allow movement of the plate relative to the body.

24 Claims, 9 Drawing Sheets

SWING VALVE

CROSS-REFERENCE TO RELATED APPLICATIONS

This application claims priority to U.S. Provisional Patent Application No. 61/077,287, filed Jul. 1, 2008, the entire contents of which are hereby incorporated by reference.

BACKGROUND

The present invention relates to valves and, more particularly, to swing valves.

SUMMARY

The following summary sets forth certain exemplary embodiments of the invention. It does not set forth all such embodiments and is not limiting of the embodiments of the invention.

In one embodiment, a swing valve includes a body having an inner surface defining an opening, a plate positioned substantially within the opening of the body, and a pivot rod coupled to the body and the plate. The pivot rod defines a pivot axis. The plate is pivotable about the pivot axis relative to the body between an open position and a closed position. The swing valve also includes a locking mechanism coupled to the plate. The locking mechanism includes a member that is movable relative to the plate between a first position, in which the locking mechanism engages the body to lock the plate in the closed position, and a second position, in which the locking mechanism disengages the body to allow movement of the plate relative to the body.

In another embodiment, a swing valve includes a body having an inner surface defining an opening, and a plate positioned substantially within the opening of the body. The plate has an outer edge. The swing valve also includes a pivot rod coupled to the body and the plate. The pivot rod defines a pivot axis. The plate is pivotable about the pivot axis relative to the body between an open position and a closed position. The swing valve further includes a seal coupled to the outer edge of the plate. The seal is inflatable to tightly engage the inner surface of the body when the plate is in the closed position. The swing valve also includes a port coupled to the plate in communication with the seal to enable inflation of the seal.

In yet another embodiment, a swing valve includes a body having an inner surface defining an opening, and a plate positioned substantially within the opening of the body. The plate has an outer edge and a central axis extending axially through the plate. The swing valve also includes a pivot rod coupled to the body and the plate. The pivot rod defines a pivot axis. The plate is pivotable about the pivot axis relative to the body between an open position and a closed position. The pivot axis is spaced apart from the central axis of the plate to offset the pivot axis from a diameter of the plate. The swing valve further includes a seal coupled to the outer edge of the plate. The seal is inflatable to tightly engage the inner surface of the body when the plate is in the closed position. The swing valve also includes a first port coupled to the plate in communication with the seal to enable inflation of the seal, and a locking mechanism coupled to the plate. The locking mechanism includes a cylinder and a piston positioned at least partially within the cylinder. The piston is movable relative to the cylinder between a first position, in which the locking mechanism engages the body to lock the plate in the closed position, and a second position, in which the locking mechanism disengages the body to allow movement of the plate relative to the body. The swing valve further includes a second port coupled to the locking mechanism in communication with the cylinder. The second port directs pressurized fluid into the cylinder to move the piston toward at least one of the first and second positions.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
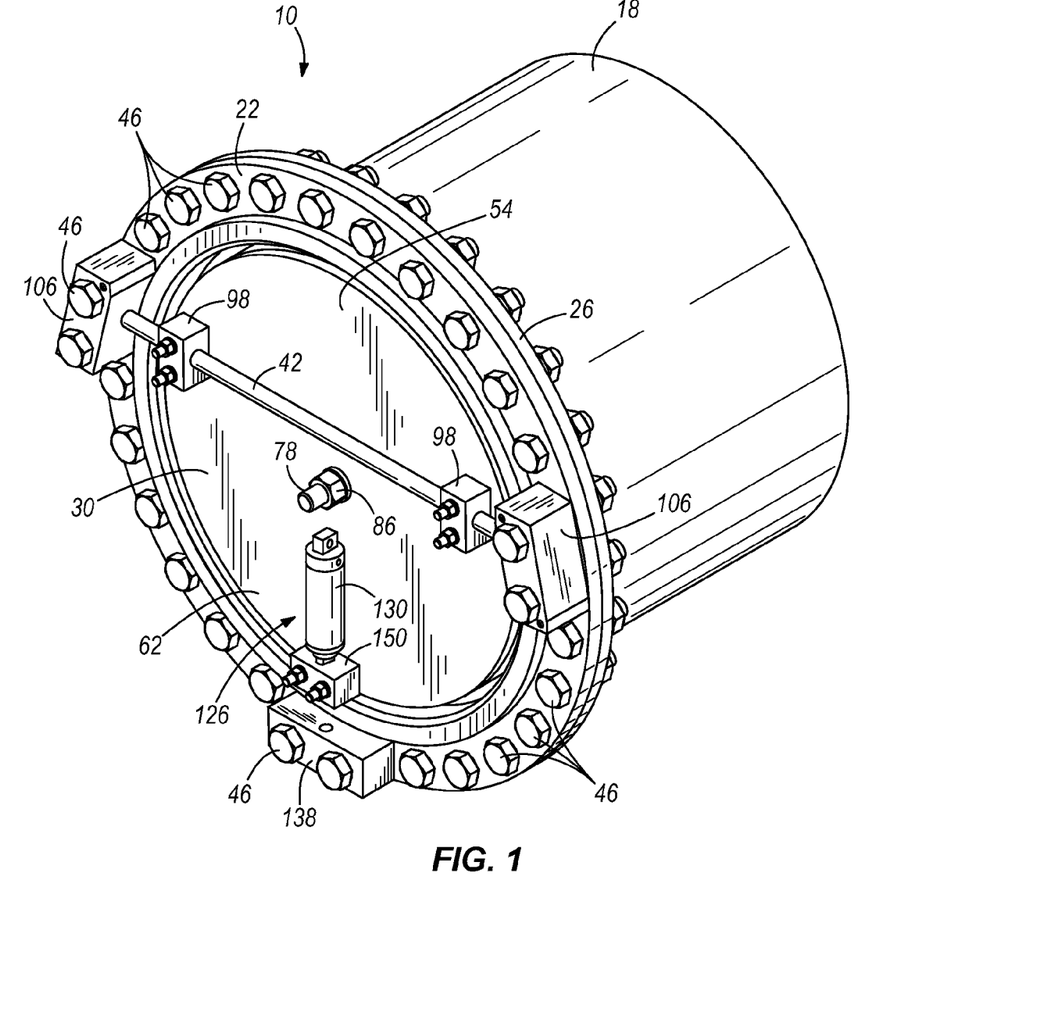
FIG. 1 is a perspective view of a swing valve embodying the invention.
Figure 2:
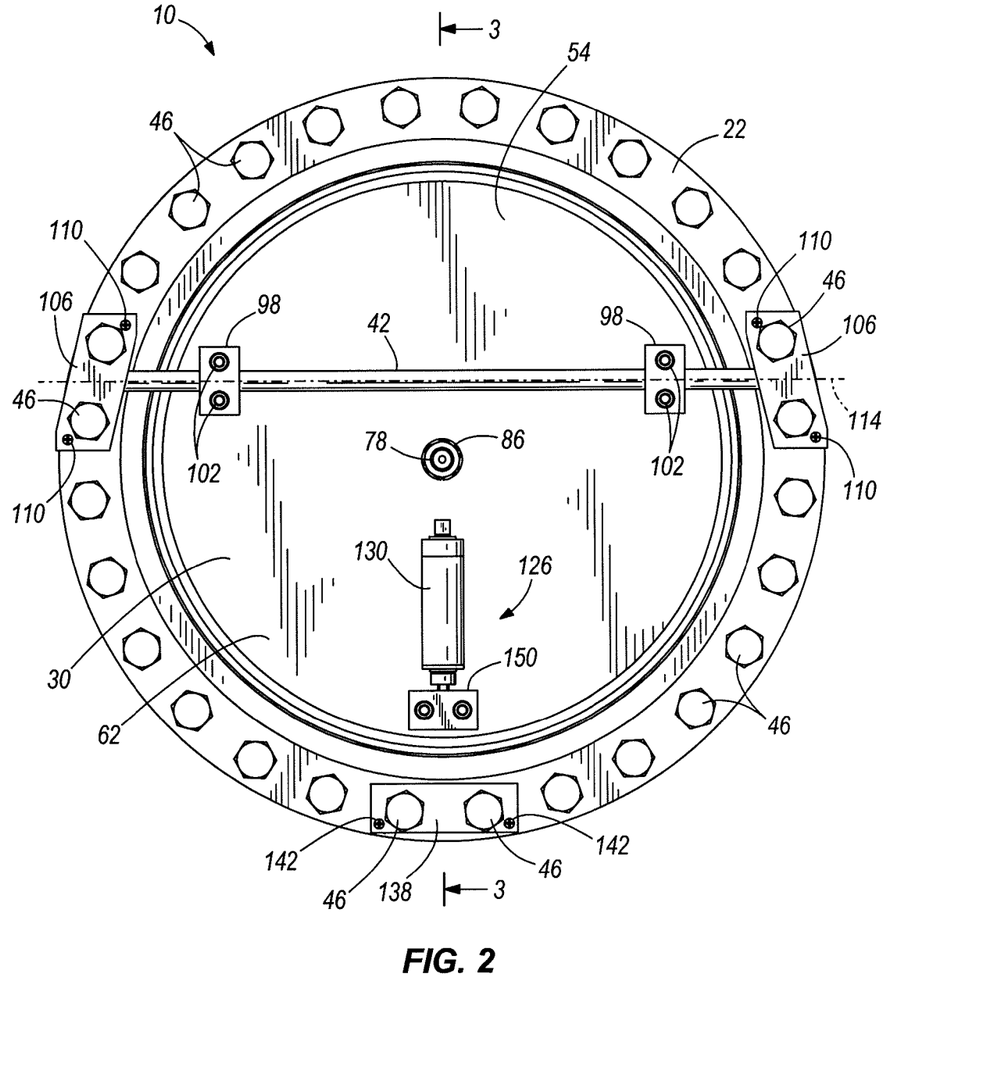
FIG. 2 is a front view of the swing valve shown in FIG. 1.
Figure 3:
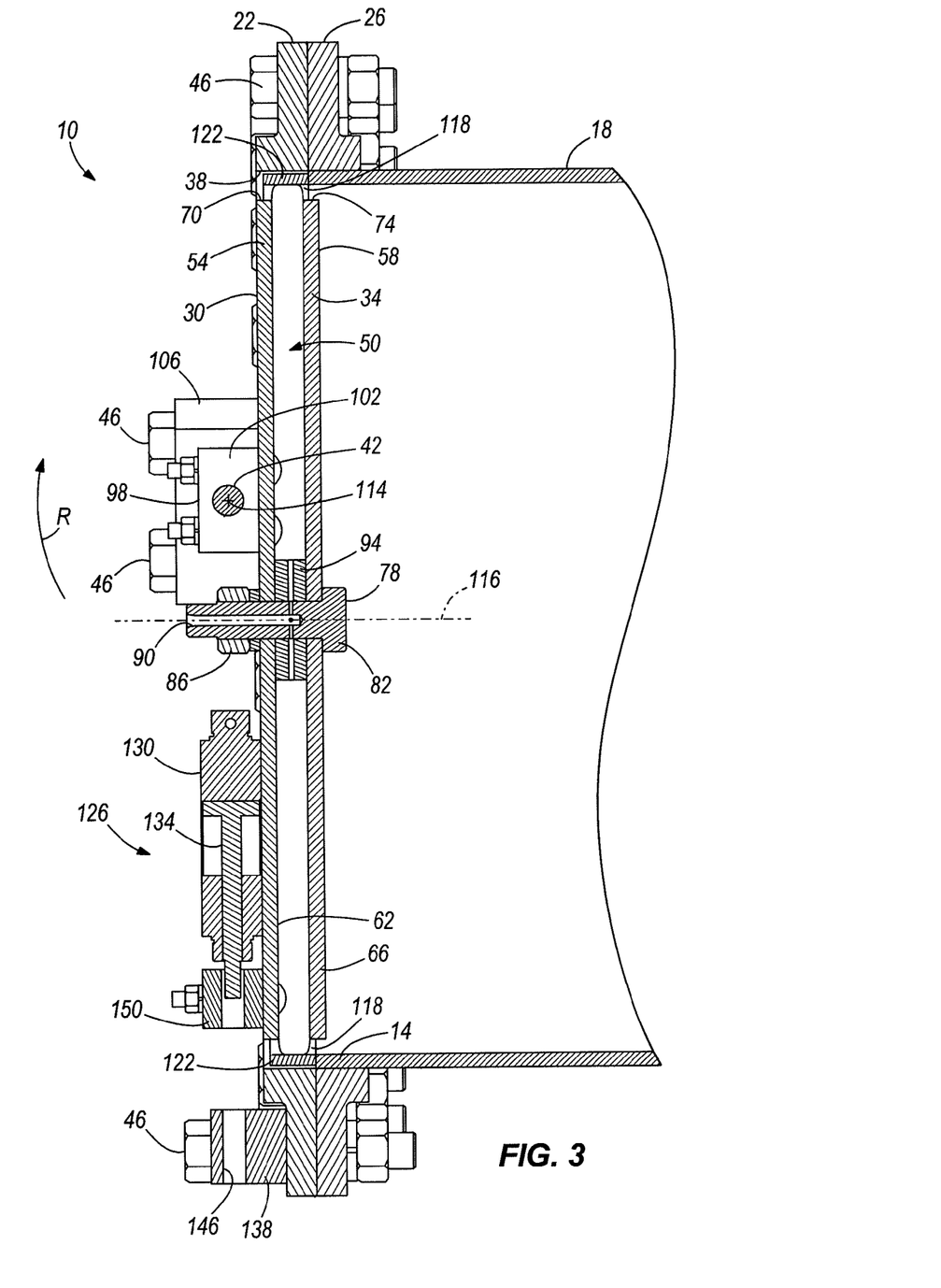
FIG. 3 is a cross-sectional view of the swing valve taken along section line 3-3 of FIG. 2.

FIGS. 1-3 illustrate a swing valve 10 according to one embodiment of the invention. The illustrated swing valve 10 is mounted to an end 14 of a conduit 18 to prevent fluid (e.g., water, oil, natural gas, water and/or chemical fire retardants, or the like) from flowing out of the conduit 18. In one embodiment, the conduit 18 may be in communication with a water storage tank on, for example, an airplane for fighting fires. In such an embodiment, the swing valve 10 is initially closed to retain water in the storage tank, but may be opened to rapidly dump the water from the storage tank onto a fire. In other embodiments, the conduit 18 may be, for example, an oil pipeline, a natural gas line, a water main, a sewer line, or the like, and the swing valve 10 may be positioned elsewhere on or in the conduit 18 to restrict or prevent fluid flow into, out of, and/or through the conduit 18.

The illustrated swing valve 10 includes a ring 22 coupled to a flange 26 of the conduit 18, a first plate 30 and a second plate 34 positioned within an opening defined by an inner surface 38 (FIG. 3) of the ring 22, and a pivot rod 42 to pivotally couple the plates 30, 34 to the ring 22. The ring 22, or valve body or slip-on flange, is shaped and sized to complement the flange 26 to mount the swing valve 10 to the end 14 of the conduit 18. In some embodiments, the swing valve 10 may be positioned between two consecutive conduits. For example, the ring 22 may be sandwiched between flanges of an upstream conduit and a downstream conduit such that the swing valve 10 selectively restricts fluid flow from the upstream conduit to the downstream conduit.

As shown in FIGS. 1 and 2, the ring 22 and the flange 26 include matching bolt patterns such that the ring 22 is coupled to the flange 26 with a series of bolts 46. In the illustrated embodiment, the ring 22 includes an ANSI Class 125/150 bolt pattern that matches the bolt pattern on the flange 26 of the conduit 18. In other embodiments, the ring 22 may be welded to the flange 26 or may be coupled to the flange 26 with adhesives or other suitable coupling means.

Referring to FIG. 3, the first and second plates 30, 34 are substantially parallel to and spaced apart from one another to define a gap 50, or chamber, therebetween. In the illustrated embodiment, the first and second plates 30, 34 are generally circular and are composed of aluminum. In other embodiments, the first and second plates 30, 34 may have a different shape (e.g., square, rectangular, octagonal, oblong, or the like) and may be composed of other materials (e.g., steel, brass, polyvinyl chloride (PVC), or the like). Each plate 30, 34 includes an upper portion 54, 58 positioned above the pivot rod 42 and a lower portion 62, 66 positioned below the pivot rod 42. The plates 30, 34 move (e.g., pivot or swing) relative to the ring 22 and the conduit 18 between a closed position (shown in FIGS. 1-3) to prevent fluid flow out of the conduit 18 and an open position (not shown) to allow fluid flow out of the conduit 18. As shown in FIG. 3, the plates 30, 34 have a diameter that is less than an inner diameter of the ring 22 such that an outer edge 70, 74 of each plate 30, 34 is spaced slightly apart from the inner surface 38 of the ring 22 when the plates 30, 34 are in the closed position.

An inflation port 78 extends through the first, or outer, plate 30 and the second, or inner, plate 34 to couple the plates 30, 34 together. In the illustrated embodiment, the inflation port 78 extends through a center of the plates 30, 34 and is threaded to secure the plates 30, 34 together between a head 82 of the inflation port 78 and a nut 86. In other embodiments, the inflation port 78 may extend through another portion of the plates 30, 34 and/or the plates 30, 34 may be coupled together with one or more fasteners that are separate from the inflation port 78. The illustrated inflation port 78 defines a passageway 90 and includes a spacer 94 positioned between the plates 30, 34 to maintain the gap 50 between the plates 30, 34. The passageway 90 is in communication with the gap 50 through the spacer 94 such that fluid (e.g., air, $CO_2$, water, hydraulic fluid, and/or other gases or liquids) may be directed into and out of the gap 50 through the inflation port 78. In some embodiments, the first and second plates 30, 34 may be replaced by a single, thicker plate defining a series of internal channels that provide the gap 50, and the inflation port 78 may be in communication with the series of internal channels to direct air into and out of the channels.

In the illustrated embodiment, the inflation port 78 and the gap 50 may be in communication with an external pressurized air source (e.g., a compressor, a pump, a storage tank, or the like) through a three-way valve. The three-way valve may be actuated to a first position to allow air to flow from the pressurized air source into the gap 50, a second position to allow air to flow out of the gap 50, and a third position to inhibit air flow into and out of the gap 50. In other embodiments, the inflation port 78 and the gap 50 may be coupled to the pressurized air source with two separate valves that may be actuated independently. In such embodiments, one of the valves may be opened to allow air to flow into the gap 50, the other valve may be opened to allow air to flow out of the gap 50, or both valves may be closed to inhibit air flow into and out of the gap 50. In some embodiments, the three-way valve or the two valves may be actuated remotely using, for example, a solenoid. In other embodiments, the three-way valve or the two valves may be actuated manually.

As shown in FIGS. 1-3, the pivot rod 42 extends across the plates 30, 34 and is coupled to the first plate 30 via two supports 98. The illustrated supports 98 are coupled to the first plate 30 with bolts 102. The pivot rod 42 is also coupled to the ring 22 via two pivot blocks 106. In the illustrated embodiment, the pivot blocks 106 are coupled to the ring 22 with the bolts 46 used to mount the ring 22 to the flange 26 of the conduit 18. Relatively smaller fasteners 110 (FIG. 2), such as, for example, small bolts or screws, couple the pivot blocks 106 to the ring 22 when the ring 22 is not bolted to the flange 26. In some embodiments, the ring 22 may be omitted and the pivot blocks 106 may be mounted directly to the flange 26 of the conduit 18.

The illustrated pivot rod 42 defines a pivot axis 114 such that the plates 30, 34 may pivot about the pivot axis 114 relative to the ring 22 between the closed position and the open position. In the illustrated embodiment, the pivot rod 42 fits loosely within the pivot blocks 106 and fits tightly within the supports 98 such that the pivot rod 42, the supports 98, and the plates 30, 34 rotate together relative to the blocks 106 about the pivot axis 114. The pivot blocks 106 may include bushings or bearings to reduce friction and wear as the pivot rod 42 rotates within the blocks 106. In other embodiments, the pivot rod 42 may fit loosely within the supports 98 such that the supports 98 and the plates 30, 34 rotate together relative to the pivot rod 42 about the pivot axis 114. In such embodiments, the supports 98 may include bushings or bearings to reduce friction and wear as the supports 98 rotate about the pivot rod 42.

As shown in FIG. 3, the pivot rod 42, and thereby the pivot axis 114, are substantially perpendicular to and spaced apart from (e.g., above) a central axis 116 extending through the conduit 18 and the plates 30, 34. Such an arrangement offsets the pivot axis 114 from a diameter of the plates 30, 34 so that forces (e.g., fluid pressure) are not equally distributed on each side of the pivot axis 114 to substantially balance each other out. With the pivot axis 114 offset from the central axis 116, the plates 30, 34 rotate about the pivot axis 114 when a force is applied to an inner surface of the second plate 34.

The illustrated swing valve 10 also includes an elastomeric seal 118 coupled to the outer edges 70, 74 of the plates 30, 34. As shown in FIG. 3, the seal 118 is in communication with the gap 50, or chamber, between the plates 30, 34 such that the seal 118 may be inflated through the inflation port 78 by the pressurized air source. When the seal 118 is inflated (as shown in FIGS. 1-3), the seal 118 expands radially outward from the edges 70, 74 of the plates 30, 34 and tightly engages the inner surface 38 of the ring 22 to prevent fluid from flowing or leaking out of the conduit 18. Deflating the seal 118 by, for example, opening a valve (e.g., the three-way valve) in communication with the inflation port 78 releases the seal 118 from the inner surface 38 of the ring 22 such that the plates 30, 34 may pivot about the pivot axis 114 relative to the ring 22 and the conduit 18. In the illustrated embodiment, the elastomeric seal 118 is composed of a MULTI-FLEX® thermoplastic elastomer (manufactured by Multibase, Inc. of Copley, Ohio), although other suitable elastic, rubber, and/or expandable materials may also be employed.

As shown in FIG. 3, a band 122, or hoop, is positioned within the elastomeric seal 118 to help maintain the general shape of the seal 118 during inflation and deflation. The illustrated band 122 is composed of, for example, a metal or polymeric strip such that the band 122 may elastically deflect. When the seal 118 is inflated, the band 122 helps press the seal 118 into tight engagement with the inner surface 38 of the ring 22. The band 122 also helps define the shape of the inflated seal 118 to ensure that the seal 118 uniformly engages the ring 22.

As shown in FIGS. 1-3, the swing valve 10 includes a locking mechanism 126 to retain the plates 30, 34 in the closed position. The illustrated locking mechanism 126 includes a locking cylinder 130 coupled to the first plate 30 and a piston 134 (FIG. 3) positioned at least partially within the cylinder 130. The locking cylinder 130 is mounted proximate to the outer edge 70 of the first plate 30 and substantially inline with a lock block 138 on the ring 22. Similar to the pivot blocks 106, the lock block 138, or anchor, is mounted to the ring 22 with the bolts 46 used to connect the ring 22 to the flange 26 of the conduit 18. Relatively smaller fasteners 142 (FIG. 2), such as, for example, small bolts or screws, couple the lock block 138 to the ring 22 when the ring 22 is not mounted to the flange 26. The lock block 138 defines a channel 146 configured to receive a portion of the piston 134 from the locking cylinder 130. In some embodiments, the relative positions of the locking cylinder 130 and the lock block 138 may be reversed.

The piston 134, or locking member, is extendable from the locking cylinder 130 to slide into the channel 146 in the lock block 138 and lock the plates 30, 34 in the closed position. In the illustrated embodiment, a guide block 150 is coupled to the first plate 30 adjacent to the locking cylinder 130 to guide the piston 134 toward the lock block 138. The guide block 150 also helps support the piston 134 against forces to rotate the plates 30, 34 from the closed position to the open position. To allow the plates 30, 34 to pivot about the pivot axis 114 to the open position, the piston 134 is retracted (as shown in FIG. 3) into the cylinder 130 such that the piston 134 does not engage the lock block 138. In the illustrated embodiment, the locking cylinder 130 is a pneumatic device such that the piston 134 is actuated by a pressurized gas from, for example, the pressurized air source used to inflate the seal 118. Similar to the inflation port 78, the locking cylinder 130 may be in communication with the air source through a three-way valve to extend and retract the piston 134. The three-way valve may be actuated remotely by a user with a solenoid or may be actuated manually. In other embodiments, the locking cylinder 130 may be, for example, a hydraulic cylinder, a magnetic lock, or the like.

The method of operating the swing valve 10 is as follows. To set the first and second plates 30, 34 in the closed position (as shown in FIGS. 1-3), the plates 30, 34 are oriented generally perpendicular to the end 14 of the conduit 18 to substantially block the opening. Using the external pressurized air (or other fluid) source, the elastomeric seal 118 is inflated until the seal 118 tightly engages the inner surface 38 of the ring 22, preventing fluid from flowing or leaking out of the conduit 18. The piston 134 is extended from the locking cylinder 130 through the guide block 150 and into the channel 146 in the lock block 138 to lock the plates 30, 34 in the closed position.

To pivot the plates 30, 34 to the open position, the three-way valve in communication with the locking cylinder 130 is actuated to retract the piston 134 out of the channel 146 in the lock block 138. The valve in communication with the inflation port 78 is also actuated such that extra pressurized air (or other fluid) within the gap 50 between the plates 30, 34 flows out of the inflation port 78. The elastomeric seal 118 thereby deflates and releases from tight engagement with the inner surface 38 of the ring 22. Fluid within the conduit 18 pushes against the lower portion 66 of the second plate 34, forcing the plates 30, 34 to pivot about the pivot axis 114 in the direction of arrow R (FIG. 3). That is, the lower portions 62, 66 of the plates 30, 34 are generally pushed upwardly and outwardly relative to the conduit 18, while the upper portions 54, 58 of the plates 30, 34 pivot inwardly and downwardly relative to the conduit 18. As such, the plates 30, 34 are moved to the open position so that the fluid may flow out of the conduit 18.

FIGS. 4-8 illustrate a swing valve 210 according to another embodiment of the invention. Similar to the swing valve 10 discussed above, the illustrated swing valve 210 includes a valve body 214, a plate 218 positioned within an opening 222 (FIG. 8) defined by an inner surface 226 of the valve body 214, and a pivot rod 230 to pivotally couple the plate 218 to the valve body 214. The valve body 214 is shaped and sized to mount the swing valve 210 to a flange 234 of a conduit 238. An elastic or rubber member 242 (FIGS. 6-8) is positioned between the valve body 214 and the flange 234 to inhibit leaking. In the illustrated embodiment, the valve body 214 is connected to the flange 234 by a series of bolts 246. In other embodiments, the valve body 214 may be connected to the flange 234 using other suitable coupling means.

Figure 6:
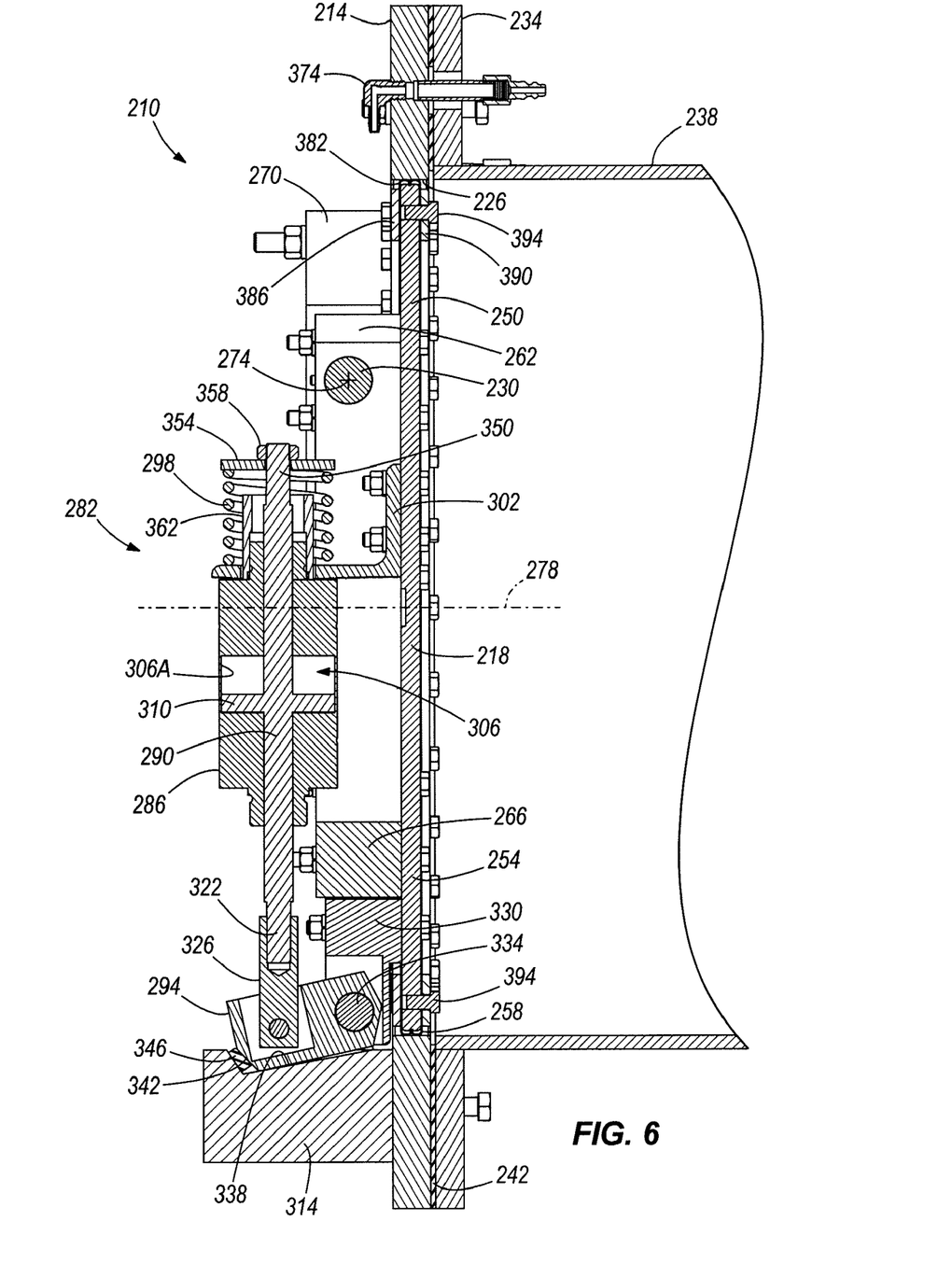
FIG. 6 is a cross-sectional view of the swing valve taken along section line 6-6 of FIG. 5, the swing valve including a locking mechanism in a locked position.
Figure 7:
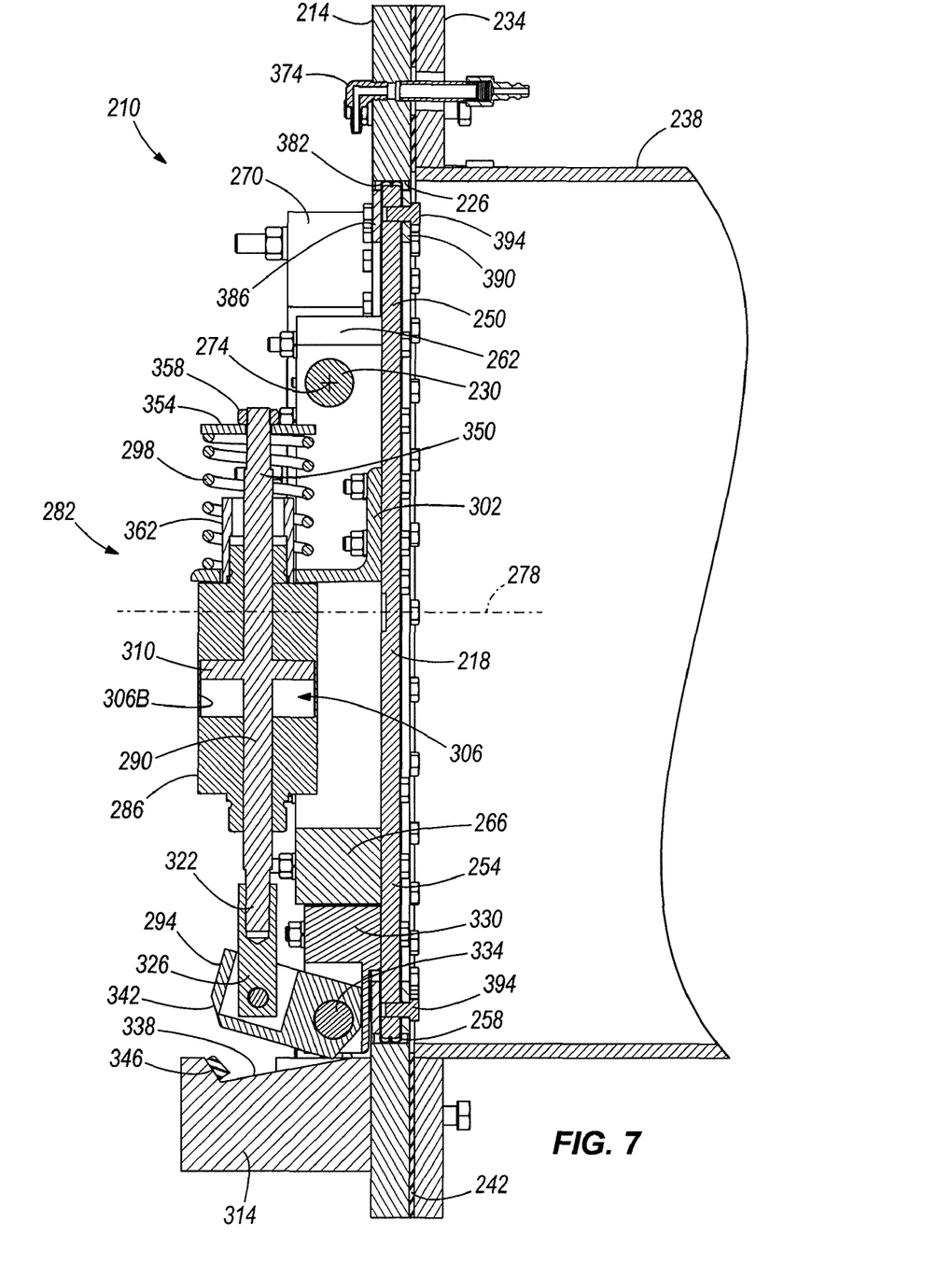
FIG. 7 is a cross-sectional view of the swing valve shown in FIG. 4 with the locking mechanism in an unlocked position.

The illustrated plate 218 is generally circular to substantially cover the opening 222 of the valve body 214. In other embodiments, the plate 218 may have a different shape (e.g., square, rectangular, octagonal, oblong, or the like) to match a differently-shaped opening. The plate 218 includes an upper portion 250 positioned above the pivot rod 230 and a lower portion 254 positioned below the pivot rod 230. The plate 218 moves (e.g., pivots or swings) relative to the valve body 214 between a closed position (FIGS. 4-7) to prevent fluid flow out of the conduit 238 and an open position (FIG. 8) to allow fluid flow out of the conduit 238. As shown in FIGS. 6 and 7, the plate 218 has a diameter that is less than an inner diameter of the valve body 214 such that an outer edge 258 of the plate 218 is spaced slightly apart from the inner surface 226 of the body 214 when the plate 218 is in the closed position.

Figure 4:
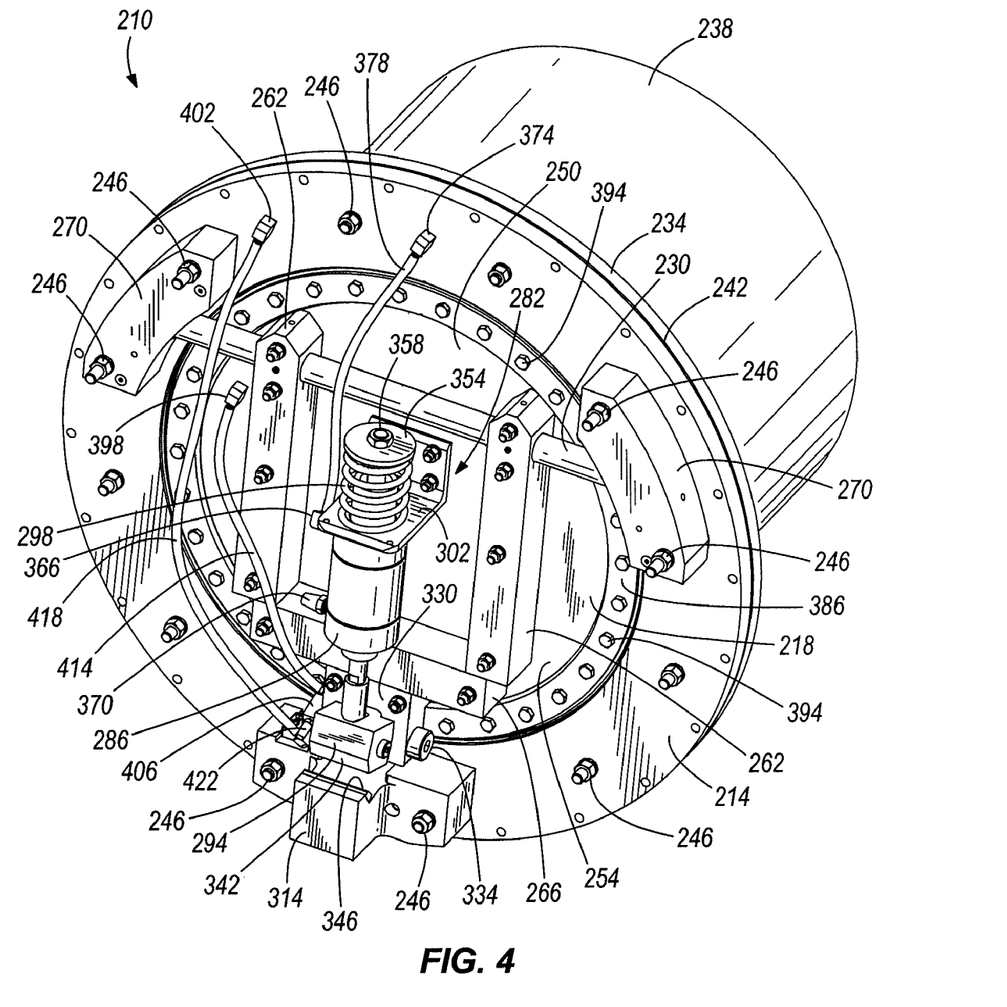
FIG. 4 is a perspective view of another embodiment of a swing valve.
Figure 5:
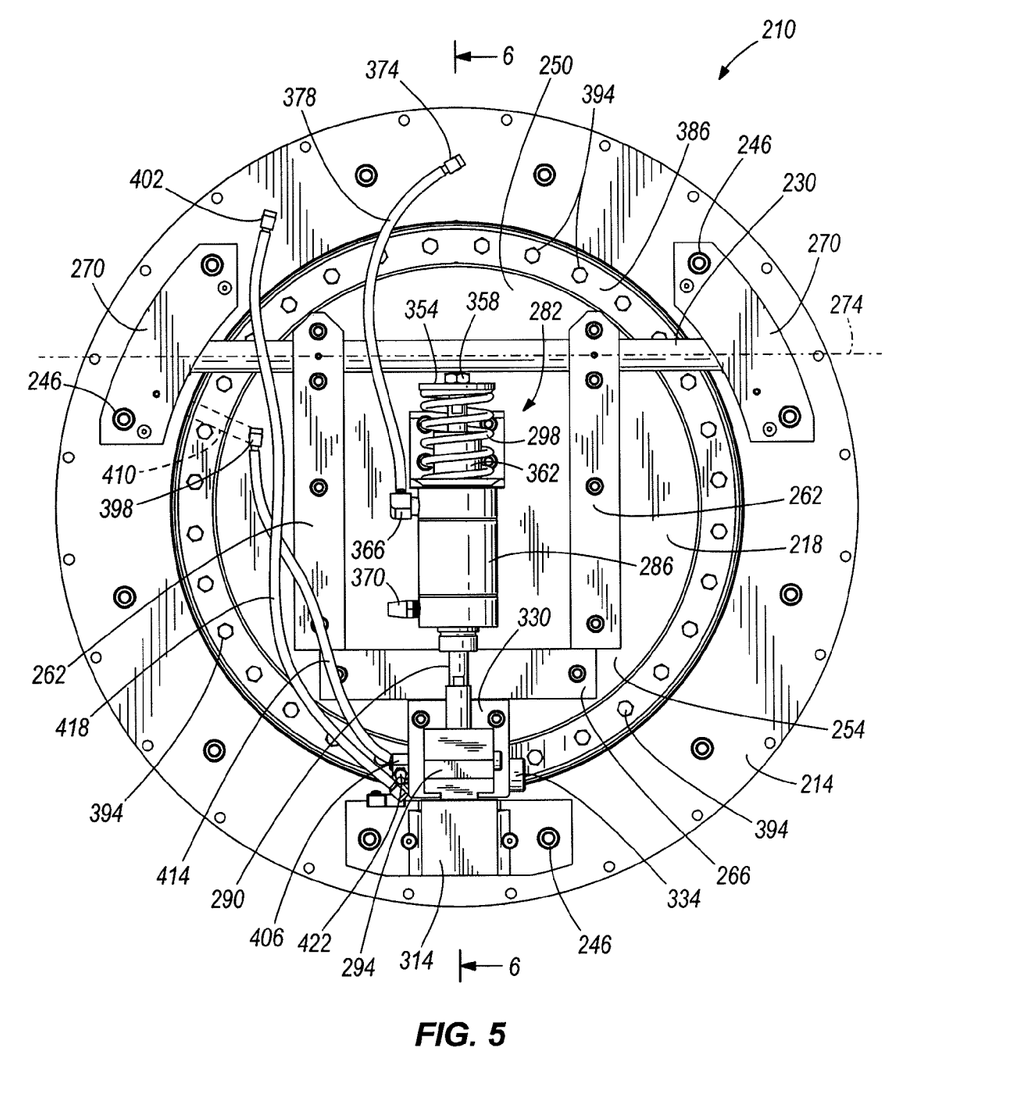
FIG. 5 is a front view of the swing valve shown in FIG. 4.

Referring to FIGS. 4 and 5, the plate 218 includes two elongated supports 262 that couple to the pivot rod 230 and a cross member 266 that extends between the supports 262. The supports 262 and the cross member 266 are bolted to the plate 218 to help reinforce the plate 218. That is, the supports 262 and the cross member 266 help stiffen the plate 218 to reduce flexing of the lower portion 254 of the plate 218 when subjected to relatively large forces, such as high fluid pressure within the conduit 238.

Figure 8:
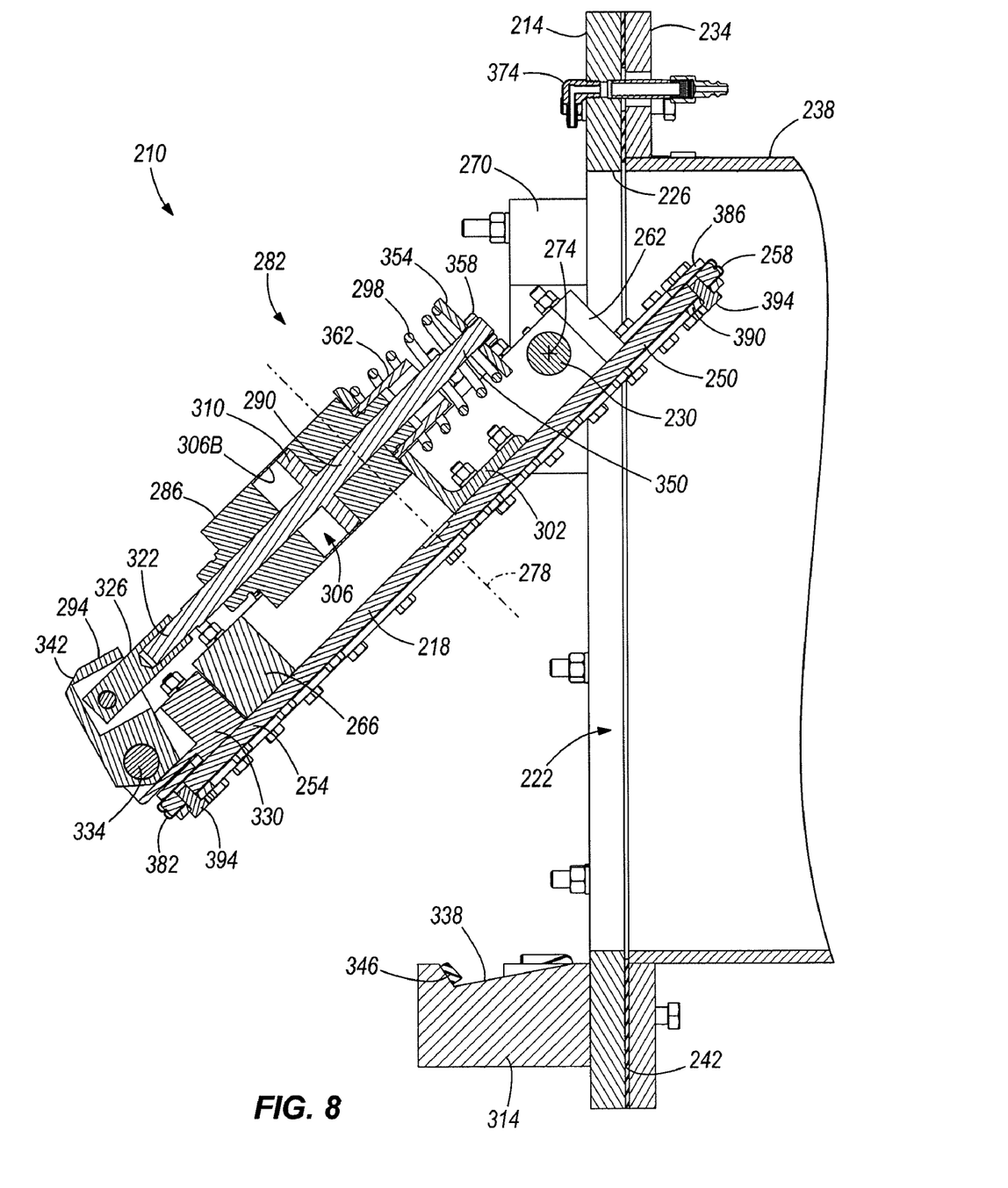
FIG. 8 is a cross-sectional view of the swing valve shown in FIG. 4 when the swing valve is open.

The pivot rod 230 extends across the plate 218 and through the elongated supports 262 to pivotally couple the plate 218 to the valve body 214. In the illustrated embodiment, the pivot rod 230 extends into two pivot blocks 270 that are coupled to the body 214 with the bolts 246. A bushing is positioned within each pivot block 270 to facilitate rotation of the pivot rod 230 relative to the blocks 270. The pivot rod 230 defines a pivot axis 274 that the plate 218 pivots about relative to the body 214 between the closed position (FIGS. 4-7) and the open position (FIG. 8). As shown in FIG. 5-7, the pivot rod 230, and thereby the pivot axis 274, is substantially perpendicular to and spaced apart from (e.g., above) a central axis 278 extending through the conduit 238 and the plate 218 such that the pivot axis 274 is offset from a diameter of the plate 218. With such an arrangement, when a fluid force is applied to the plate 218, the force is not equally divided on each side of the pivot axis 274. The plate 218 therefore pivots about the pivot rod 230 from the closed position to the open position without additional torque from a motor or other external actuator.

The swing valve 210 also includes a locking mechanism 282 to retain or lock the plate 218 in the closed position. The illustrated locking mechanism 282 includes a locking cylinder 286, a piston 290 positioned at least partially within the cylinder 286, a lock arm 294 coupled to the piston 290, and a spring 298. The cylinder 286 is mounted to the plate 218 by an L-shaped bracket 302 and defines a chamber 306 that receives a portion of the piston 290. The illustrated cylinder 286 is a pneumatic cylinder that uses pressurized air to actuate or move the piston 290. In other embodiments, the cylinder 286 may be a hydraulic cylinder that uses other pressurized fluids (e.g., water, hydraulic fluid, etc.) to actuate the piston 290.

The piston 290, or locking member, is movable relative to the locking cylinder 286 between a locked position (FIG. 6) and an unlocked position (FIG. 7). As shown in FIGS. 6-8, the piston 290 includes a flange 310 having a diameter substantially equal to a diameter of the chamber 306 of the locking cylinder 286. The flange 310 divides the chamber 306 into a first, or upper, portion 306A and a second, or lower, portion 306B. To move the piston 290 to the locked position, pressurized air is introduced into the first chamber portion 306A, pushing the piston 290 toward a lock block 314 on the valve body 214 (e.g., down in FIG. 6). In the locked position, if the plate 218 is in the closed position, the lock arm 294 engages the lock block 314 to lock the plate 218 in the closed position. To move the piston 290 to the unlocked position, the pressurized air is exhausted from the first chamber portion 306A, allowing the piston 290 to move away from the lock block 314 (e.g., up in FIG. 7). In the unlocked position, the lock arm 294 is spaced apart from the lock block 314 such that the plate 218 may pivot or swing relative to the valve body 214 between the open and closed positions.

The lock arm 294 is coupled to a first end portion 322 of the piston 290 by a link 326. The lock arm 294 is also pivotally coupled to the plate 218 by a pivot block 330 and a pin 334. The lock arm 294 moves with the piston 290 and pivots relative to the plate 218 between the locked and unlocked positions. When in the locked position (FIG. 6), the lock arm 294 engages a notch 338 in the lock block 314 to secure the plate 218 in the closed position. In some embodiments, an adjustable stopper may be positioned within the notch 338 to inhibit over rotation of the lock arm 294. The illustrated lock arm 294 includes a beveled edge 342 that contacts a wear plate 346 positioned within the notch 338. The wear plate 346 improves the engagement between the lock arm 294 and the lock block 314 and is a removable component that may be replaced if it becomes worn over time. In some embodiments, a wear plate may additionally or alternatively be coupled to the beveled edge 342 of the lock arm 294. When in the unlocked position (FIG. 7), the lock arm 294 is pivoted out of the notch 338 to provide clearance for the plate 218 to swing to the open position (FIG. 8).

The spring 298 is coupled to a second end portion 350 of the piston 290 to bias the piston 290 and the lock arm 294 toward the unlocked position. In the illustrated embodiment, the spring 298 is a coil spring, although other suitable biasing members may alternatively be employed. The piston 290 includes a relatively large-diameter washer 354 and a nut 358 on the second end portion 350. The spring 298 extends between the washer 354 and the L-shaped bracket 302 such that the spring 298 is compressed when the piston 290 is in the locked position (FIG. 6). The spring 298 biases (e.g., pushes) the piston 290 away from the lock block 314 and, thereby, helps push the pressurized air out of the first chamber portion 306A in the locking cylinder 286 to move the piston 290 to the unlocked position (FIG. 7). As such, if pressurized fluid unintentionally leaks or is discharged from the cylinder 286, the spring 298 defaults the piston 290 toward the unlocked position. A bushing 362 is positioned between the spring 298 and the piston 290 to reduce wear.

In some embodiments, pressurized fluid may be introduced into the second chamber portion 306B to move the piston 290 to the unlocked position. In such embodiments, the spring 298 may be positioned to bias the piston 290 toward the locked position. In other embodiments, pressurized fluid may be alternately introduced into both chamber portions 306A, 306B to move the piston 290 to both the locked and unlocked positions.

As shown in FIGS. 4 and 5, an inlet port 366 is coupled to the locking cylinder 286 in communication with the first chamber portion 306A. The inlet port 366 directs pressurized fluid (e.g., air, $CO_2$, water, hydraulic fluid, and/or other gases or liquids) into the chamber portion 306A to move the piston 290 relative to the cylinder 286 to the locked position. An exhaust port 370 is also coupled to the locking cylinder 286 in communication with the second chamber portion 306B. The exhaust port 370 helps expel or discharge air from the second chamber portion 306B as the first chamber portion 306A is filled with pressurized fluid. In addition, the exhaust port 370 directs ambient air into the second chamber portion 306B as the pressurized fluid is discharged from the first chamber portion 306A to prevent a vacuum from forming in the cylinder 286.

A connection port 374 is coupled to and supported by the valve body 214. In other embodiments, the connection port 374 may be coupled to a different portion of the swing valve 210. The connection port 374 facilitates connection to a pressurized fluid source (e.g., a compressor, a pump, a storage tank, or the like) such that the fluid source is not required to be connected directly to the inlet port 366. A flexible conduit 378 extends between the connection port 374 and the inlet port 366 to direct pressurized fluid from the connection port 374 to the inlet port 366. In some embodiments, the connection port 374 may be omitted and the fluid source may be connected directly to the inlet port 366.

Similar to the swing valve 10 discussed above, the illustrated swing valve 210 also includes an elastomeric seal 382 coupled to the outer edge 258 of the plate 218. The elastomeric seal 382 is inflatable to engage the inner surface 226 of the valve body 214 when the plate 218 is in the closed position. In the illustrated embodiment, the elastomeric seal 382 is composed of a MULTI-FLEX® thermoplastic elastomer (manufactured by Multibase, Inc. of Copley, Ohio), although other suitable elastic, rubber, and/or expandable materials may also be employed. As shown in FIGS. 6-8, the seal 382 is coupled to the plate 218 by two rings 386, 390. The rings 386, 390 are positioned on opposing sides, or faces, of the plate 218 adjacent to the outer edge 258 of the plate 218. Each ring 386, 390 sandwiches or captures a portion of the seal 382 between the ring 386, 390 and the corresponding side of the plate 218. Bolts 394 extend through the rings 386, 390, the seal 382, and the plate 218 to secure the seal 382 in place. In other embodiments, other suitable coupling means may also or alternatively be employed to couple the seal 382 to the plate 218.

The swing valve 210 includes an inflation port 398 coupled to the plate 218, a connection port 402 coupled to the valve body 214, and a valve block 406 in communication between the ports 398, 402 to inflate and deflate the elastomeric seal 382. The inflation port 398 is in communication with the elastomeric seal 382 through a chamber 410 (FIG. 5) formed inside the plate 218. The illustrated chamber 410 is a relatively narrow channel extending from the inflation port 398 to the outer edge 258 of the plate 218. In other embodiments, the chamber 410 may include a series of channels or passageways extending from the inflation port 398 to various points along the outer edge 258 of the plate 218. The inflation port 398 is in communication with the valve block 406 via a flexible conduit 414 to direct pressurized fluid (e.g., air, $CO_2$, water, hydraulic fluid, and/or other gases or liquids) into and out of the seal 382.

The illustrated connection port 402 is supported by the valve body 214 to facilitate connection to a pressurized fluid source (e.g., a compressor, a pump, a storage tank, or the like). In other embodiments, the connection port 402 may be coupled a different portion of the swing valve 210. Similar to the inflation port 398, the connection port 402 is in communication with the valve block 406 via a flexible conduit 418. The connection port 402 directs pressurized fluid from the external fluid source through the conduit 418 to the valve block 406. In some embodiments, the connection port 374 for the locking mechanism 282 and the connection port 402 for the elastomeric seal 382 may receive pressurized fluid from the same fluid source. In other embodiments, the connection port 402 may be omitted and the fluid source may be connected directly to the valve block 406.

The valve block 406 is in communication between the inflation port 398 and the connection port 402 to selectively inflate and deflate the elastomeric seal 382. The valve block 406 includes an exhaust port 422 to exhaust pressurized fluid from the seal 382 as the plate 218 is moved to the open position (FIG. 8). The valve block 406 is mounted to the pivot block 330 of the locking mechanism 282. In other embodiments, the valve block 406 may be mounted elsewhere on the swing valve 210.

Figure 9:
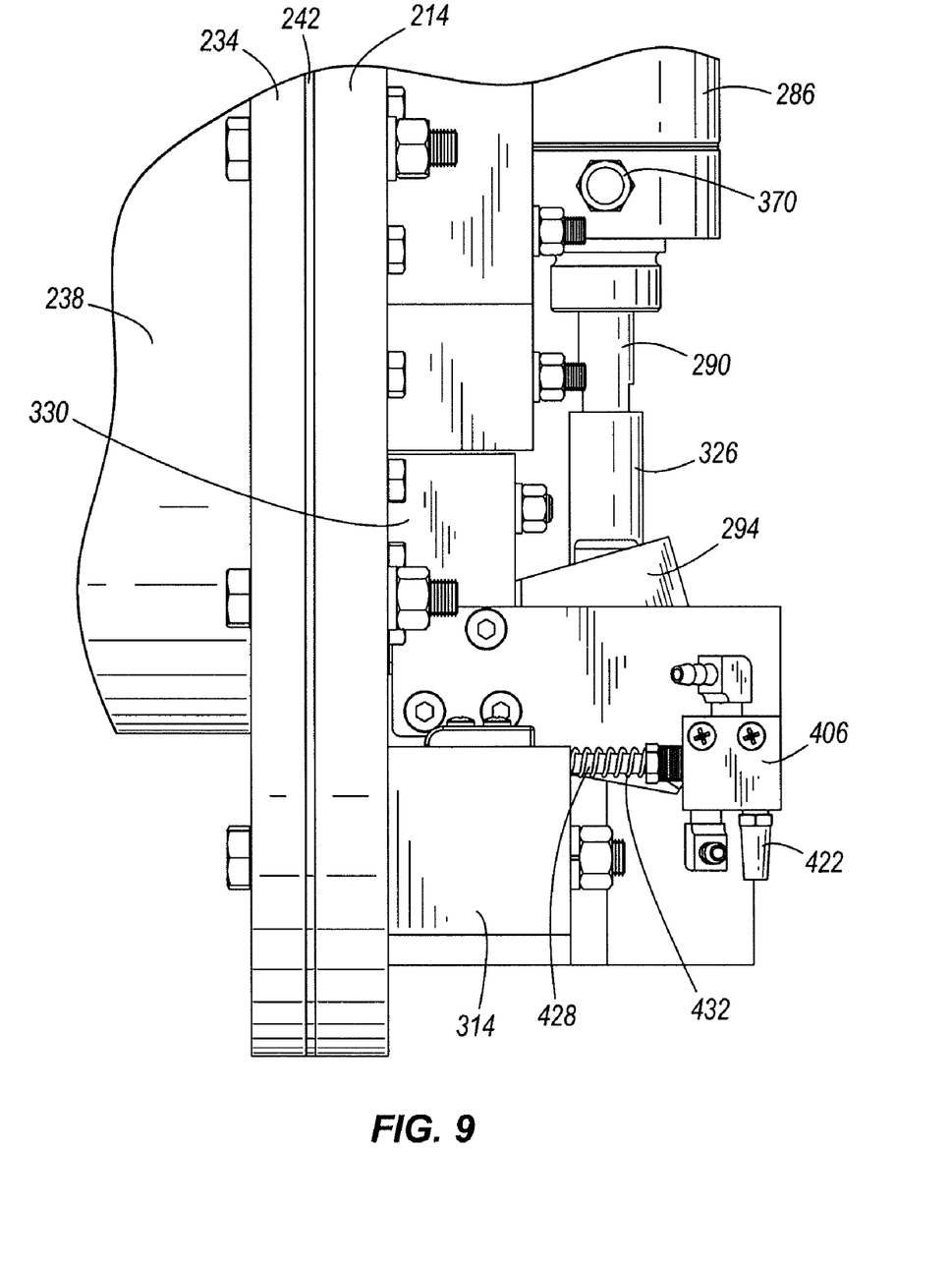
FIG. 9 is an enlarged view of a portion of the swing valve shown in FIG. 4.

FIG. 9 illustrates one example of the valve block 406 in more detail. The swing valve shown in FIG. 9 is substantially the same as the swing valve 210 discussed above, and like parts have been given the same reference numerals. As shown in FIG. 9, when the swing valve 210 is closed, the valve block 406 engages a plunger 428 that actuates the valve block 406 such that pressurized fluid flows into the conduit 414 to inflate the seal 382. The plunger 428 is biased into engagement with the valve block 406 by a spring 432. When the swing valve 210 is opened, the valve block 406 moves away from and disengages the plunger 428. Once the plunger 428 is disengaged, the valve block 406 is actuated to open the exhaust port 422, allowing the seal 382 to deflate. As such, the valve block 406 helps prevent rupturing of the elastomeric seal 382 by only allowing the seal 382 to inflate when the plate 218 is in the closed position.

In some embodiments, actuation of the locking mechanism 282 and inflation and deflation of the elastomeric seal 382 may be controlled remotely by a user through a control panel or other controller. Additionally or alternatively, the swing valve 210 may include solenoids or electrically-actuated valves to control fluid flow into and out of the locking mechanism 282 and/or the elastomeric seal 382. In further embodiments, the locking mechanism 282 may be actuated directly by a solenoid rather than pressurized fluid.

The method of operating the swing valve 210 is as follows. To close and lock the swing valve 210, the plate 218 is pivoted about the pivot rod 230 to the closed position (FIGS. 4-7) to substantially cover the opening 222 of the valve body 214. Once the plate 218 is in the closed position, pressurized fluid from an external source is directed through the connection port 374, the conduit 378, and the inlet port 366 and into the first chamber portion 306A of the locking cylinder 286. The pressurized fluid pushes against the flange 310 of the piston 290 to move the piston 290 from the unlocked position (FIG. 7) to the locked position (FIG. 6). The piston 290 in turn pivots the lock arm 294 relative to the plate 218 and into the notch 338 of the lock block 314. The beveled edge 342 of the lock arm 294 engages the wear plate 346 on the lock block 314 to lock the plate 218 in the closed position.

When the plate 218 is in the closed position, as shown in FIGS. 6 and 7, the elastomeric seal 382 is inflated to completely seal the swing valve 210. Pressurized fluid from an external source is directed through the connection port 402, the conduit 418, the valve block 406, the conduit 414, and the inflation port 398 to the chamber 410 formed in the plate 218. The chamber 410 directs the pressurized fluid to the outer edge 258 of the plate 218 to inflate the seal 382. As the seal 382 inflates, the seal 382 tightly engages the inner surface 226 of the valve body 214, preventing fluid from leaking out of the conduit 238.

To unlock and open the swing valve 210, the locking mechanism 282 is moved from the locked position (FIG. 6) to the unlocked position (FIG. 7). The exhaust port 370 on the locking cylinder 286 is opened to allow ambient air from the environment to flow into the second chamber portion 306B. At the same time, the spring 298 biases (e.g., pushes) the piston 290 toward the unlocked position such that the pressurized fluid in the first chamber portion 306A is discharged from the cylinder 286. As the piston 290 moves to the unlocked position, the piston 290 pivots the lock arm 294 out of the notch 338 in the lock block 314. The lock arm 294 thereby disengages the lock block 314 to unlock the plate 218 from the valve body 214. Once unlocked, the plate 218 may pivot about the pivot rod 230 to the open position (FIG. 8)

As the plate 218 pivots toward the open position, the elastomeric seal 382 is deflated. In some embodiments, the elastomeric seal 382 may be deflated at substantially the same time that the locking mechanism 282 is unlocked. To deflate the seal 382, the exhaust port 422 on the valve block 406 is opened such that pressurized fluid in the seal 382 flows out of the seal 382 through the inflation port 398, the conduit 414, and the valve block 406.

Although the invention has been described in detail with reference to preferred embodiments, variations and modifications exist within the scope and spirit of one or more independent aspects of the invention as described. Various features and advantages of the invention are set forth in the following claims.

The invention claimed is:

1. A swing valve comprising:
    a body having an inner surface defining an opening;
    a plate positioned substantially within the opening of the body;
    a pivot rod coupled to the body and the plate, the pivot rod defining a pivot axis, the plate being pivotable about the pivot axis relative to the body between an open position and a closed position;
    a locking mechanism coupled to the plate, the locking mechanism including a member that is movable relative to the plate between a first position, in which the locking mechanism engages the body to lock the plate in the closed position, and a second position, in which the locking mechanism disengages the body to allow movement of the plate relative to the body;
    a first port coupled to the locking mechanism in communication with the member, wherein the first port directs pressurized fluid toward the locking mechanism to move the member relative to the plate, wherein the locking mechanism further includes a cylinder and the member includes a piston positioned at least partially within the cylinder, and wherein the first port is in communication with the cylinder to direct pressurized fluid into the cylinder to move the piston relative to the plate toward at least one of the first and second positions;

a seal coupled to an outer edge of the plate, the seal being inflatable to tightly engage the inner surface of the body when the plate is in the closed position; and a second port coupled to the plate in communication with the seal to enable inflation of the seal.

2. The swing valve of claim 1, wherein the locking mechanism further includes a biasing member coupled to the piston, and wherein the biasing member biases the piston toward one of the first and second positions.

3. The swing valve of claim 2, wherein pressurized fluid in the cylinder moves the piston to the first position, and wherein the biasing member biases the piston from the first position toward the second position.

4. The swing valve of claim 1, wherein the locking mechanism further includes a lock arm and the body includes a lock block, wherein the lock arm is pivotally coupled to the plate and is coupled to the piston for movement relative to the plate between the first and second positions, and wherein the lock arm engages the lock block when in the first position to lock the plate in the closed position.

5. The swing valve of claim 1, wherein the body includes a lock block, and wherein the piston directly engages the lock block when in the first position to lock the plate in the closed position.

6. The swing valve of claim 1, further comprising:
a third port coupled to the body, the third port configured to receive pressurized fluid from an external source, and
a conduit extending between the first and third ports to direct pressurized fluid from the third port to the first port.

7. The swing valve of claim 1, wherein the plate defines a central axis extending axially through the plate, and wherein the pivot axis is spaced apart from the central axis such that the pivot axis is offset from a diameter of the plate.

8. A swing valve comprising:
a body having an inner surface defining an opening;
a plate positioned substantially within the opening of the body, the plate having an outer edge;
a pivot rod coupled to the body and the plate, the pivot rod defining a pivot axis, the plate being pivotable about the pivot axis relative to the body between an open position and a closed position;
a seal coupled to the outer edge of the plate, the seal being inflatable to tightly engage the inner surface of the body when the plate is in the closed position;
a first port coupled to the plate in communication with the seal to enable inflation of the seal;
a locking mechanism coupled to the plate, wherein the locking mechanism includes a member that is movable relative to the plate between a first position, in which the locking mechanism engages the body to lock the plate in the closed position, and a second position, in which the locking mechanism disengages the body to allow movement of the plate relative to the body, wherein the locking mechanism includes a cylinder and the member includes a piston positioned at least partially within the cylinder; and
a second port coupled to the cylinder in communication with the piston, wherein the second port directs pressurized fluid into the cylinder to move the piston relative to the plate toward at least one of the first and second positions.

9. The swing valve of claim 8, wherein the plate defines a chamber communicating between the first port and the outer edge to direct pressurized fluid from the first port to the seal.

10. The swing valve of claim 9, wherein the chamber is formed within the plate.

11. The swing valve of claim 9, wherein the plate is a first plate, and further comprising a second plate coupled to and spaced apart from the first plate to define the chamber therebetween, wherein the second plate has an outer edge and is pivotable with the first plate between the open position and the closed position, and wherein the seal is also coupled to the outer edge of the second plate.

12. The swing valve of claim 8, further comprising:
a valve block coupled to one of the body and the plate, and
a conduit extending between the valve block and the first port, the conduit directing pressurized fluid from the valve block to the first port to inflate the seal and directing pressurized fluid from the first port to the valve block to deflate the seal.

13. The swing valve of claim 12, wherein the conduit is a first conduit, and further comprising:
a third port coupled to the body, the third port configured to receive pressurized fluid from an external source, and
a second conduit extending between the third port and the valve block to direct pressurized fluid from the third port to the valve block.

14. The swing valve of claim 8, further comprising:
a first ring coupled to a first side of the plate adjacent to the outer edge, the first ring capturing a portion of the seal between the first ring and the first side of the plate, and
a second ring coupled to a second side of the plate adjacent to the outer edge, the second ring capturing a portion of the seal between the second ring and the second side of the plate.

15. The swing valve of claim 8, wherein the plate defines a central axis extending axially through the plate, and wherein the pivot axis is spaced apart from the central axis such that the pivot axis is offset from a diameter of the plate.

16. A swing valve comprising:
a body having an inner surface defining an opening;
a plate positioned substantially within the opening of the body, the plate having an outer edge and a central axis extending axially through the plate;
a pivot rod coupled to the body and the plate, the pivot rod defining a pivot axis, the plate being pivotable about the pivot axis relative to the body between an open position and a closed position, the pivot axis being spaced apart from the central axis of the plate such that the pivot axis is offset from a diameter of the plate;
a seal coupled to the outer edge of the plate, the seal being inflatable to tightly engage the inner surface of the body when the plate is in the closed position;
a first port coupled to the plate in communication with the seal to enable inflation of the seal;
a locking mechanism coupled to the plate, the locking mechanism including a cylinder and a piston positioned at least partially within the cylinder, the piston movable relative to the cylinder between a first position, in which the locking mechanism engages the body to lock the plate in the closed position, and a second position, in which the locking mechanism disengages the body to allow movement of the plate relative to the body; and
a second port coupled to the locking mechanism in communication with the cylinder, the second port directing pressurized fluid into the cylinder to move the piston toward at least one of the first and second positions.

17. The swing valve of claim 16, wherein the plate defines a chamber communicating between the first port and the outer edge to direct pressurized fluid from the first port to the seal.

18. The swing valve of claim 17, wherein the chamber is formed within the plate.

19. The swing valve of claim 17, wherein the plate is a first plate, and further comprising a second plate coupled to and spaced apart from the first plate to define the chamber therebetween, wherein the second plate has an outer edge and is pivotable with the first plate between the open position and the closed position, and wherein the seal is also coupled to the outer edge of the second plate.

20. The swing valve of claim 16, further comprising:
   a third port coupled to the body, the third port configured to receive pressurized fluid from an external source,
   a valve block coupled to one of the body and the plate,
   a first conduit extending between the third port and the valve block to direct pressurized fluid from the third port to the valve block, and
   a second conduit extending between the valve block and the first port, the second conduit directing pressurized fluid from the valve block to the first port to inflate the seal and directing pressurized fluid from the first port to the valve block to deflate the seal.

21. The swing valve of claim 16, wherein the locking mechanism further includes a biasing member coupled to the piston, wherein pressurized fluid in the cylinder moves the piston to the first position, and wherein the biasing member biases the piston from the first position toward the second position.

22. The swing valve of claim 16, wherein the locking mechanism further includes a lock arm and the body includes a lock block, wherein the lock arm is pivotally coupled to the plate and coupled to the piston for movement relative to the plate between the first and second positions, and wherein the lock arm engages the lock block when in the first position to lock the plate in the closed position.

23. The swing valve of claim 16, wherein the body includes a lock block, and wherein the piston directly engages the lock block when in the first position to lock the plate in the closed position.

24. The swing valve of claim 16, further comprising:
   a third port coupled to the body, the third port configured to receive pressurized fluid from an external source, and
   a conduit extending between the second and third ports to direct pressurized fluid from the third port to the second port.

* * * * *